Nov. 2, 1971  N. W. COLLING ET AL  3,616,763
LINEAR INDUCTION MOTOR RAIL
Filed June 13, 1969
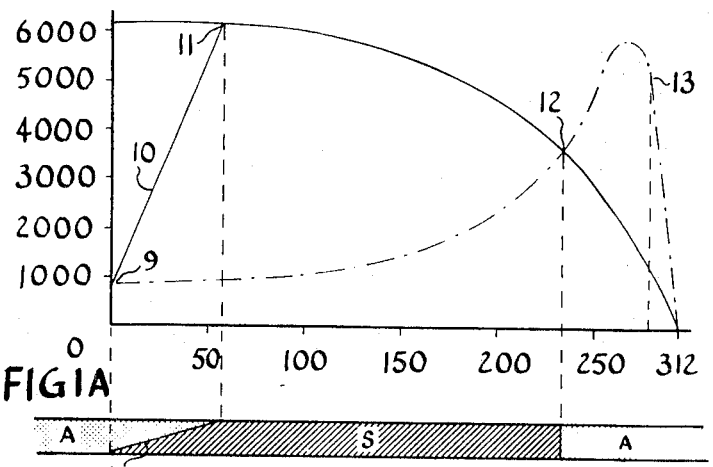
FIG 1A
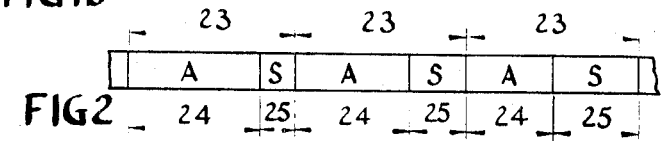
FIG 1B
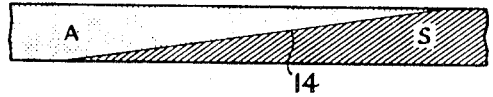
FIG 2
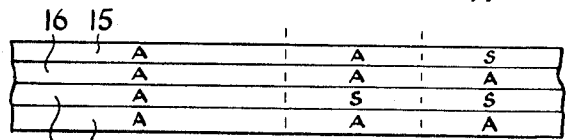
FIG 3
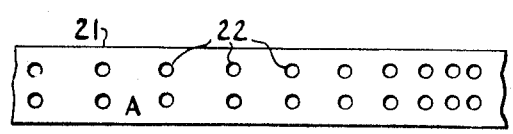
FIG 4
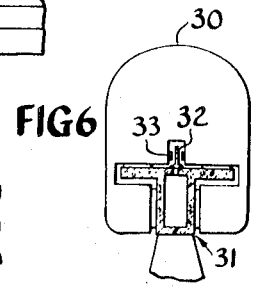
FIG 5
FIG 6

United States Patent Office 3,616,763
Patented Nov. 2, 1971

3,616,763
LINEAR INDUCTION MOTOR RAIL
Norman Whitfield Colling and George Philip Quayle, Fulwood, England, assignors to Tracked Hovercraft Limited, London, England
Filed June 13, 1969, Ser. No. 833,026
Claims priority, application Great Britain, June 14, 1968, 28,379/68
Int. Cl. B60m 1/30
U.S. Cl. 104—148                                 10 Claims

ABSTRACT OF THE DISCLOSURE

The thrust speed characteristic of a linear induction motor is varied by varying the composition of the linear motor rail. The rail can have an initial length of low resistivity, such as aluminium, to produce a low starting thrust followed by a length of progressively increasing resistivity to produce a progressively increasing thrust, followed by a length of high resistivity, such as manganese steel alloy. There may be a final length of lower resistivity again, such as aluminium for high speed operation.

---

This invention relates to linear induction motor rails.

Linear induction motors comprise a stator carrying a series of windings or coils which are fed with an alternating current to produce a traveling magnetic field which reacts with an elongated rotor or rail to produce propulsion.

The rail is usually held stationary and the stator can be connected to a track guided vehicle which has to be propelled.

An object of the invention is to provide means for carrying or controlling the acceleration and/or thrust developed by the motor.

According to one aspect of the invention there is provided a linear induction motor rail which is held stationary and is adapted for co-operation with a linear motor stator connected to a vehicle in which the resistivity of the rail varies along at least part of its length so that there is a progressively varying starting thrust for a linear motor stator along said part of said length.

According to another aspect of the invention there is provided a linear induction motor rail which is held stationary and is adapted for co-operation with a linear motor stator connected to a vehicle, the rail having a first length formed of a second material of a greater resistivity than said first material, and an intermediate length between said first and seconds lengths, said intermediate length having a resistivity which varies along its length in such a way that the starting thrust for a linear motor stator varies progressively from the starting thrust produced by said first length to the starting thrust produced by said second length. A third length of a material having a resistivity lower than said second material may follow the second length.

The composition of the rail may be varied by, for example, varying the metallic constituents of the rail. Alternatively, the composition can be varied by including air spaces or apertures in a metallic rail, there being progressively more air gaps per unit length along its length.

One way of varying the metallic composition of the rail is to include slugs of one metal A at spaced intervals in a rail of another metal B so that the proportion of one metal with respect to the other varies along its length. If this is done so that there is a length of metal B and a slug of metal A in the rail contained within the linear dimension of the stator, and this sequence is repeated, by varying the proportion of the metals A and B different acceleration characteristics can be produced, since the thrust/speed characteristic of a linear motor depends, for a given motor, supply voltage and frequency, on the particular metal used.

Another way of interspersing one metal into a rail made of another metal would be to use a scarf joint. Another way would be to use a laminated rail, of, say, five laminae, and to vary the composition by changing the number of laminae of the base metal of the rail. For example, we might start with five layers of aluminium and then substitute progressively non-magnetic steel for aluminium until the whole rail was a non-magnetic steel rail.

In the accompanying drawings:

FIG. 1A is a graph of the thrust in pounds plotted against speed in mile per hour for a given linear induction motor, showing the effect of using a manganese steel alloy rotor or rail, in firm line, and the effect of using an aluminium alloy rotor or rail in chain dotted line;

FIG. 1B shows diagrammatically the composition of an aluminium alloy rail with interspersed steel portions adapted to achieve a desired rate of acceleration;

FIGS. 1A and 1B are related;

FIG. 2 shows a section through a composite rotor or rail;

FIGS. 3 and 4 show further alternative forms of composite rail;

FIG. 5 shows a rail in which there are air spaces, the proportion of air spaces being varied along the length of the rail; and FIG. 6 shows a cross section of a tracked hovercraft on a track with a rail according to the invention.

It will be noted from FIG. 1A that the thrust/speed characteristic of a non-magnetic manganese steel alloy rail, the characteristic being shown in firm line, is very different from the characteristic for an aluminium alloy rail, shown in chain dotted line. This difference is particularly marked at zero speed where the thrust available, using a manganese steel alloy rail, may be too high and might produce an unpleasant jerk if the whole of it were used when a vehicle starts from rest. By varying the composition of the rail so that there is an increasing proportion of manganese steel alloy in a basically aluminium alloy rail the thrust/speed characteristics can be made to follow the line marked 10. Aluminium parts are marked A and manganese steel parts are marked S. Thus, at the point marked 9 at the beginning of the line marked 10 the rail is wholly aluminium so that at zero speed there is a thrust employed to start the acceleration of a little under 1,000 lbs., but at the end of the line marked 10, i.e. the point 11 where the composition of the rail is wholly manganese steel alloy, the thrust employed is about 6,000 lbs. By having a gradually increasing proportion of manganese steel alloy, there is a smooth acceleration as represented by the line 10. Steel is retained so that the available thrust follows the curve of manganese steel alloy between points 11 and 12, point 12 being a cross-over point of the two characteristics. At this point the rail is changed to aluminium alloy again so as to follow the characteristic of an aluminium alloy rail, until the point 13 is reached, corresponding to a speed of, say, 275 miles per hour, which might be the cruising speed of a linear motor propelled air cushion vehicle type vehicle of the kind shown in British patent specifications 995,127 and 1,002,588.

By comparing FIGS. 1A and 1B it will be seen that the point at which the aluminium/steel composite becomes entirely steel corresponds to the point 11 on the graph, and point at which the aluminium/steel composite becomes encorresponds to the point 12.

The composite material in FIG. 1B is made by making a scarf joint along the line 14 between a wedge of aluminium and one of steel. This is shown in more detail in FIG. 3.

In FIG. 2 another way of achieving a composite rail is shown. The rail is divided up into equal length sections 23, each section corresponding to the linear extent of the stator of the motor. In the first section 23 the portion market 24 is aluminium and the portion marked 25 is steel. In the second section 23 the proportion of aluminium 24 has been reduced and the proportion of steel 25 increased. Again in the next section the proportion of aluminium has been reduced again and the proportion of steel increased, so that progressively longer lengths of magnetic steel are interposed between progressively shorter lengths of aluminium.

Since the stator of the electric motor covers a length equivalent to the whole of length 23 at any one instant, the overall effect of this method of dispersion of the steel into the aluminium is the same as if it were more uniformly dispersed.

The steel used for the rail is preferably substantially non-magnetic manganese steel alloy containing 11 to 14 percent manganese.

An alternative way of making a composite rail is shown in FIG. 4 where there are a number of layers 15, 16, 17 and 18 forming laminae which act as the rail. The proportion of steel to aluminium can be varied. For example, starting from the left in FIG. 4, up to the line 19, all the laminae are made of aluminium. Between the line 19 and the line 20 the lamina 17 is changed to steel so that three quarters of the rail is aluminium. If the composition of lamina 15 is changed to steel at the point 20, then after the point 20 half of the rail is aluminium.

In FIG. 5 is shown a rail 21 which there are a number of holes or air spaces 22. The proportion of holes increases progressively along the rail from left to right so that the rail consists of an aluminium/air composite. The effect of an increase in the proportion of the air is to increase the available thrust from the rail for a given voltage applied to the linear motor. If the vehicle travels from left to right this configuration will produce a progressively increasing thrust.

In FIG. 6 a tracked air cushion vehicle 30 is shown mounted on a concrete track 31. A rail 32 according to the invention extends along the track 31 and a stator 33 connected to the vehicle co-operates with the rail 32 to propel the vehicle.

We claim:

1. A linear induction motor rail having a first length formed of a first metallic material and a second length formed of a second metallic material of a greater electrical resistivity than said first material, and an intermediate length between said first and second lengths, said intermediate length having a resistivity which increases progressively along its length from the resistivity of the first material at its end adjacent the first length to the resistivity of the second material at its end adjacent the second length, whereby a linear induction motor stator arranged for electromagnetic co-operation with the rail is subject to a progressively varying thrust as it moves along said intermediate length.

2. A rail as claimed in claim 1 in which said second material is substantially non-magnetic manganese steel alloy.

3. A rail as claimed in claim 1 in which said second material is substantially non-magnetic manganese steel alloy and said first material includes aluminium.

4. A rail as claimed in claim 1 in which a third length of a material having a resistivity lower than said second material follows the second length.

5. A rail as claimed in claim 1 in which the intermediate length is formed from two metals, the proportion of one metal will respect to the other varying along the length of the intermediate length.

6. A rail as claimed in claim 1 in which the intermediate length is formed from said first and second materials, progressively longer lengths of said second material being interposed between progressively shorter lengths of said first material with distance along the intermediate length from the first length toward the second length.

7. A rail as claimed in claim 1 in which the intermediate length is formed from laminae of said first and second materials, being comprised of progressively more laminae of said second material relative to said first material with distance along the intermediate length from the first length toward the second length.

8. A rail as claimed in claim 1 in which the intermediate length is formed with air gaps which, per unit length of the intermediate length, increase progressively with distance along the intermediate length from the first length toward the second length.

9. A rail as claimed in claim 1 in combination with a track for a track guided vehicle.

10. A rail as claimed in claim 1 in combination with a track and a linear motor propelled vehicle for travelling along said track.

References Cited

UNITED STATES PATENTS

| | | | |
|---|---|---|---|
| 2,103,716 | 12/1937 | Frickey | 238—122 UX |
| 2,276,782 | 3/1942 | Jones | 238—150 |
| 2,345,691 | 4/1944 | Wagner et al. | 238—230 |
| 3,222,464 | 12/1965 | Dehn | 238—14.3 |
| 3,356,276 | 12/1967 | Robinson, Jr., et al. | 238—14.8 |
| 3,357,511 | 12/1967 | Mackie | 104—148 LM |
| 3,385,228 | 5/1968 | Chung | 104—134 |
| 3,407,749 | 10/1968 | Frig | 104—148 LM |

ARTHUR L. LA POINT, Primary Examiner

R. A. BERTSCH, Assistant Examiner

U.S. Cl. X.R.

238—150; 310—13; 318—135

PO-1050
(5/69)

UNITED STATES PATENT OFFICE
CERTIFICATE OF CORRECTION

Patent No. 3,616,763                 Dated    November 2, 1971

Inventor(s)      N. W. Colling et al.

It is certified that error appears in the above-identified patent and that said Letters Patent are hereby corrected as shown below:

Column 1, line 49, after "a", first occurrence, insert --first material and a second length formed of a--. Column 2, line 17, "mile" should read --miles--; line 65, delete "vehicle", first occurrence; line 69, after "and" insert --the--; line 70, "aluminium/steel composite becomes en-" should read --steel changes back to aluminium--. Column 3, line 35, after "21" insert --in--. Column 4, line 16, "will" should read --with--.

Signed and sealed this 9th day of May 1972.

(SEAL)
Attest:

EDWARD M.FLETCHER,JR.           ROBERT GOTTSCHALK
Attesting Officer                 Commissioner of Patents